United States Patent [19]

Glenn et al.

[11] Patent Number: 4,725,110
[45] Date of Patent: Feb. 16, 1988

[54] METHOD FOR IMPRESSING GRATINGS WITHIN FIBER OPTICS

[75] Inventors: William H. Glenn, Vernon; Gerald Meltz, Avon, both of Conn.; Elias Snitzer, Wellesley, Mass.

[73] Assignee: United Technologies Corporation, Hartford, Conn.

[21] Appl. No.: 925,512

[22] Filed: Oct. 27, 1986

Related U.S. Application Data

[63] Continuation of Ser. No. 640,489, Aug. 13, 1984, abandoned.

[51] Int. Cl.$^4$ .............................. G02B 6/12
[52] U.S. Cl. ........................ 350/3.61; 350/3.7; 350/96.19; 350/96.23; 356/32
[58] Field of Search ............ 350/96.11, 96.19, 96.23, 350/3.61, 3.7, 3.70, 162.17, 162.2, 162.21; 356/32

[56] References Cited

U.S. PATENT DOCUMENTS

| | | | |
|---|---|---|---|
| 4,068,190 | 1/1978 | Ferguson | 350/388 |
| 4,093,339 | 6/1978 | Cross | 350/3.7 |
| 4,286,838 | 9/1981 | Huignard et al. | 350/96.11 |
| 4,295,738 | 10/1981 | Meltz et al. | 356/32 |
| 4,400,056 | 8/1983 | Cielo | 350/96.19 |
| 4,653,906 | 3/1987 | Dunphy et al. | 356/32 |

FOREIGN PATENT DOCUMENTS 110207 8/1980 Japan.

OTHER PUBLICATIONS

Tomlinson et al., *Applied Physics Letters* vol. 26, No. 6, Mar. 1975, pp. 303–306.
Photosensitivity in Optical Fiber Waveguides: Application to Reflection Filter Fabrication K. O. Hill et al, Appl. Phys. Letter 32(10), May 15, 1978.
Photosensitive Phenomena in Optical Fibers, J. LaPierre et al.
Narrow-Band Bragg Reflectors in Optical Fibers, B. S. Kawasaki et al, Optics Letters, vol. 3, No. 2, Aug. 1978.
S. K. Yao et al, Applied Optics, vol. 21, pp. 3059–3060, (1982).

*Primary Examiner*—Bruce Y. Arnold
*Assistant Examiner*—Martin Lerner
*Attorney, Agent, or Firm*—Peter R. Ruzek; Eric W. Petraske; Robert P. Sabath

[57] ABSTRACT

A method of establishing a dielectric periodic index of refraction phase grating upon the core of an optical waveguide by intense angled application of several transverse beams of ultraviolet light, enabling the establishment of a distributed, spatially resolving optical fiber strain gauge.

5 Claims, 6 Drawing Figures

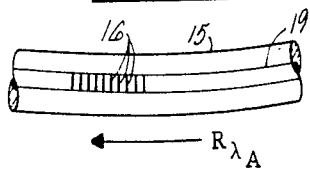
FIG. 2A
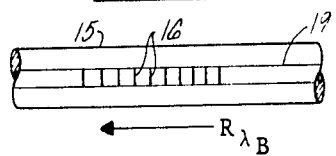
FIG. 2B
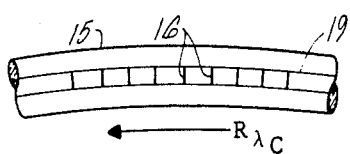
FIG. 2C
FIG. 3
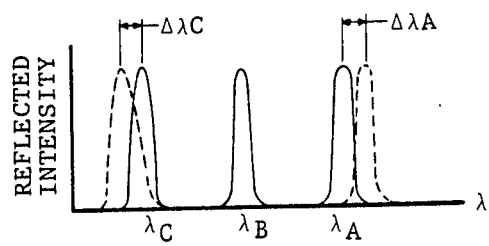

METHOD FOR IMPRESSING GRATINGS WITHIN FIBER OPTICS

This application is a continuation of application Ser. No. 640,489, now abandoned, filed Aug. 13, 1984.

Technical Field

This invention relates to impressing, establishing, printing or writing phase gratings in optical fibers or waveguides and the optical detection and measurement of strain distributions with multi-wavelength light provided to said phase gratings.

BACKGROUND OF THE INVENTION

It is known to determine the distribution of axial strain or temperature along the length of a fiber optic sensor according to the technique described by S. K. Yao et al. in 21 Applied Optics (1982) pages 3059–3060. According to this technique, very small deformations at the interface between an optical core and its cladding will cause light measurably to couple from core to cladding modes. This permits measurements by time-domain reflectometry or a series of cladding taps to determine transmission loss and the distribution of applied perturbations.

DISCLOSURE OF INVENTION

According to the invention, phase gratings are impressed along the core of an optical waveguide by the application of intense beams of ultraviolet light transverse to the axis of the core at selected angles of incidence and the complements thereto.

BRIEF DESCRIPTION OF THE DRAWING

FIGS. 2A through 2C are partial schematics of selected sections of the optical waveguide including its cores, indicating grating patterns of varying spacing corresponding to selected regions A, B and C in a mechanical structure being monitored for strain;

FIG. 3 is a graph of the intensity spectrum of the reflected light produced by injecting broadband light into the core of the waveguide with shifts in the spectral lines indicating strain at specific stations.

BEST MODE FOR CARRYING OUT THE INVENTION

Figure 1:
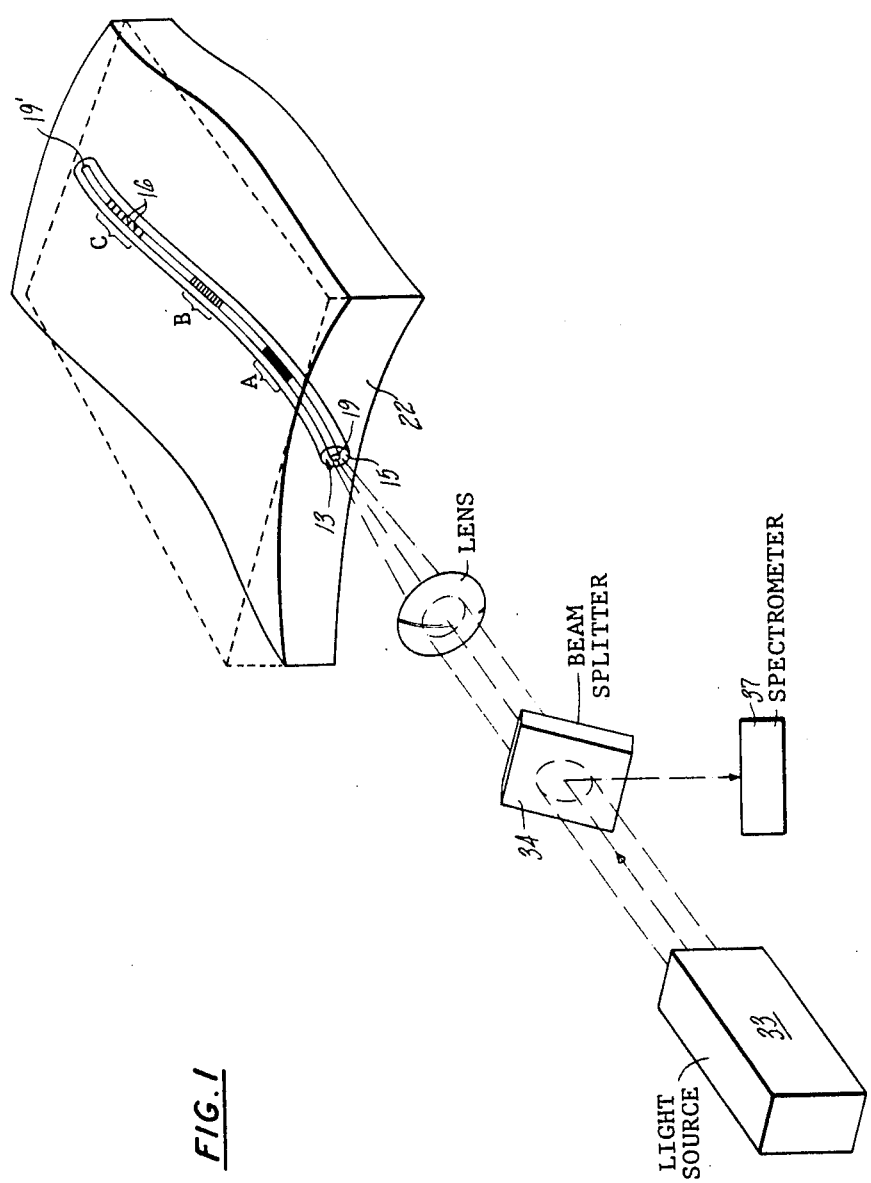
FIG. 1 is a schematic drawing of the spatially resolving optical fiber strain gauge according to the invention addressed herein.

FIG. 1 shows a schematic diagram of the spatially resolving optical fiber strain gauge 13. The gauge 13 includes an optical waveguide 15 or fiber operative to transmit a single or lowest order mode of injected light. The core 19 of waveguide 15 is preferably a Germanium-doped silica or glass filament. The core 15 contains a series of variable spacing Bragg reflection gratings 16 written, impressed or otherwise applied by application of a variable two-beam ultraviolet (less than 300 nanometer) interference pattern. These periodic gratings 16 or refractive index perturbations are permanently induced by exposure to intense radiation.

FIGS. 2A through 2C shows the establishment of different wavelength gratings 16 corresponding to respective locations on core 19.

Each of selected gratings 16 is formed by transverse irradiation with a particular wavelength of light in the ultraviolet absorption band of the core material associated with a position in a structural component 22. This procedure establishes a first order absorption process by which gratings 16 each characterized by a specific spacing and wavelength can be formed by illuminating core 19 from the side with two coplanar, coherent beams 19 incident at selected and complementary angles thereto with respect to the axis of core 19. The grating period is selected by varying the selected angles of incidence. Thus, a permanent change in the refractive index is induced in a predetermined region of core 19, in effect creating a phase grating effective for affecting light in core 19 at selected wavelengths.

As indicated in FIG. 1 the optical waveguide 15 and core 19 are attached or embedded in a section of structural component 22, in particular a plate for example. Core 19 contains characteristic periodic refractive index perturbations or gratings 16 in regions A, B and C thereof. A broadband light source 33 or tunable laser is focused through lens 33' onto the exposed end of core 19. A beam splitter 34 serves to direct the return beam from core 19 toward a suitable readout or spectrometer 37 for analysis. Alternatively, a transmitted beam passing out of the end 19' of core 19 could be analyzed.

The spectrum of the reflected light intensities from strain gauge 13 is shown in FIG. 3. A complementary tranmitted spectrum is also established passing out of the end 19' of core 19. The spectrum contains three narrowband output lines centered at respective wavelengths: lambda$_A$, lambda$_B$ and lambda$_C$. These output signals arise by Bragg reflection or diffraction from the phase gratings 16 at respective regions A, B and C. In this example, regions A and C of structural component 22 have been strained by deformation, causing a compression and/or dilation of the periodic perturbations in the fiber core.

As a result, the corresponding spectral lines are shifted as shown in FIG. 3 to the dotted lines indicated. The respective wavelength differences delta lambda$_A$ and delta lambda$_C$ are proportional to strain in respective regions A and C.

Figure 4:
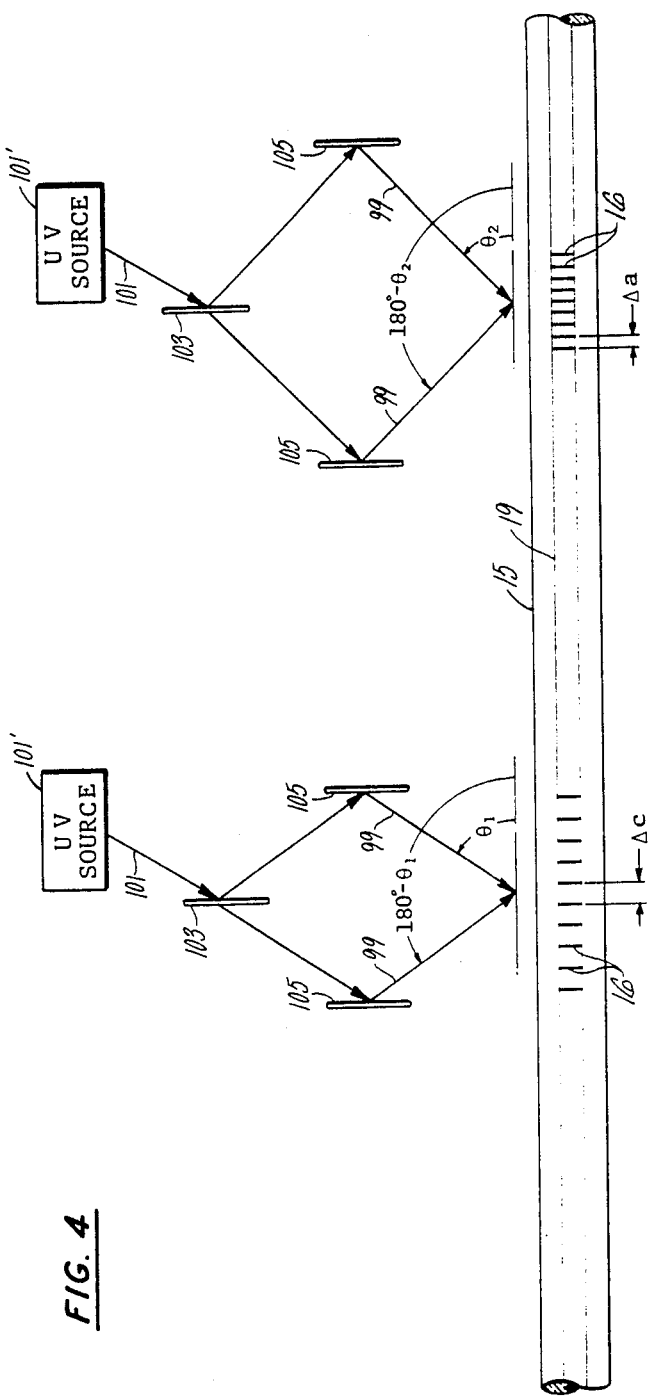
FIG. 4 shows a schematic illustration of a technique for establishing a grating pattern of variable spacing at selected positions along the length of the optical waveguide.

FIG. 4 illustrates the formation of periodic perturbations or gratings 16 in a region of fiber core 19 in response to exposure of core 19 to intense transverse ultraviolet radiation. Grating spacings $\Delta a$ and $\Delta c$ are controlled by the incidence angle of incident interfering beams 99 and beam 101. As can be seen, the angles of incidence of beams 99 are complements (i.e. their sum equals 180 degrees) to each other with respect to the axis of core 19. The incident pair of beams 99 can be derived from a single incident beam 101 passing in part through a beam splitter 103 and reflecting from spaced parallel reflectors 105. By increasing the separation between reflectors 105 and correspondingly varying the angles of incidence of beam 101, the angles of incidence of beams 99 upon core 19 can be controlled. Accordingly, the fringe spacing in grating 16 is varied as desired along the length of core 19, to permit a determination of strain or temperature corresponding to location along gauge 13.

Several spacings can be superimposed or colocated by this technique for the response set forth below.

Sensitivity to external perturbations upon structural component 22 and thus also upon core 19 depends upon the Bragg condition for reflected wavelength. In particular, the fractional change in wavelength due to mechanical strain or temperature change is:

$$d(\lambda_i)/\lambda_i = (q + \alpha)\Delta T + (1 + [\partial w/\partial e]/w)e \simeq$$
$$8 \times 10^{-6}/°C. + 8 \times 10^{-7}/\text{microstrain},$$

q is the thermooptic coefficient, which is wavelength dependent;
$\alpha$ is the expansion coefficient;
$\epsilon$ is the axial or longitudinal strain;
$\lambda_i$ is the wavelength reflected by the grating at location i along the core 19;
n is the refractive index of the optical waveguide; and
$\Delta T$ is the change in temperature.

This relationship suggests a way to compensate for temperature changes along the length of the fiber sensor. In particular, if superimposed gratings of different spacings are provided, each of the two gratings will be subject to the same level of strain, but the fractional change in wavelength of each grating will be different because q is wavelength dependent.

Accordingly, each pair of superimposed gratings will display a corresponding pair of peaks of reflected or transmitted intensity. Accordingly, the shifts of these peaks due to a combination of temperature and strain can be subtracted. The shifts in these peaks due to strain will be the same in magnitude. Accordingly, any remaining shift after subtraction is temperature related. Thus, when it is desired to know the strain difference as between several locations possibly subject to a temperature difference, the temperature factor can be compensated.

The relationship therefore permits compensation for temperature variation during measurement, since the photoelastic and thermoptic effects are wavelength dependent. In other words, by superimposing two or more gratings at each location of interest, two or more spectral lines are established at each point of measurement. Strain will affect both lines equally; temperature will not. Thus, sufficient information is available to permit determination of the magnitude of strain and the temperature difference.

The information above is likely to cause others skilled in the art to conceive of other variations in carrying out the invention addressed herein, which nonetheless are within the scope of the invention. Accordingly, reference to the claims which follow is urged, as those specify with particularly the metes and bounds of the invention.

We claim:

1. A method of impressing at least one grating into at least one predetermined region of a core of an optical fiber which further includes a cladding surrounding the core and is centered on a longitudinal axis, comprising the steps of
   making the core of a material of a material whose index of refraction can be permanently changed by exposing such material to light of a predetermined intensity at a wavelength in a predetermined range of the spectrum; and
   simultaneously exposing the core through the cladding to two light beams propagating at respective different angles of incidence relative to the longitudinal axis of the optical fiber toward and through the cladding into the predetermined region of the core to form an interference pattern of longitudinally varying intensity propagating transversely through the core and forming permanent periodic refractive index perturbations in the material of the predetermined region of the core in dependence on the intensity of the interference pattern.

2. The method as defined in claim 1, wherein said exposing step includes using light beams of a wavelength in the ultraviolet range of the spectrum.

3. The method as defined in claim 2, wherein the wavelength of said light beams is less than 300 nanometers.

4. The method as defined in claim 1, wherein said exposing step includes so selecting the angles of incidence of the light beams that the periodicity of the refractive index perturbations corresponds to one-half of a selected wavelength of light propagating through the optical fiber during the use thereof.

5. The method as defined in claim 4, and further comprising the step of additionally performing said exposing step through the cladding on at least one additional predetermined region of the core at respective additional angles of incidence that differ from one another and from those used during said exposing step to form a different interference pattern of longitudinally varying intensity propagating transversely through the core and forming permanent periodic refractive index perturbations in the material of the additional predetermined region of the core in dependence on the intensity of the interference pattern, the additional angles of incidence of the light beams being such that the periodicity of the refractive index perturbations corresponds to one-half of another selected wavelength of light propagating through the optical fiber during the use thereof.

* * * * *